United States Patent Office 3,557,047
Patented Jan. 19, 1971

3,557,047
DIALLYL PHTHALATE MOLDING COMPOSITIONS
Carl L. Wright, Glen Burnie, and James L. Thomas, Baltimore, Md., assignors to FMC Corporation, New York, N.Y., a corporation of Delaware
No Drawing. Continuation-in-part of application Ser. No. 556,543, June 10, 1966. This application Jan. 22, 1969, Ser. No. 793,162
Int. Cl. C08f 45/04
U.S. Cl. 260—41                                   2 Claims

ABSTRACT OF THE DISCLOSURE

This specification discloses molding compositions comprising a diallyl orthophthalate prepolymer, a catalyst to promote the heat advancing thereof and about 1% to about 2.5% magnesium oxide based on the diallyl phthalate prepolymer, whereby crystalline sublimate formation as high temperatures is avoided.

CROSS REFERENCE TO RELATED APPLICATIONS

This application is a continuation-in-part of United States patent application No. 556,543, filed June 10, 1966, now abandoned.

BACKGROUND OF THE INVENTION

(A) Field of the invention

This invention relates to diallyl phthalate molding compositions which have substantially improved properties wherein small percentages of magnesium oxide are used to control crystalline sublimate at elevated temperatures.

(B) Description of the prior art

Diallyl phthalate resins have been used for many years in the preparation of electrical moldings. They have the unique property of retaining their electrical properties when wet, and have therefore been used in electrical applications where moisture is apt to be present. These molding compositions are generally made from the so-called prepolymers. The diallyl phthalate monomers are polymerized by heat, with or without a catalyst, to just short of gelation, to produce solutions of soluble polymer in monomer; the monomer is then separated from the polymer by solvent extraction or distillation to produce the desired prepolymer, which is soluble polymer free of monomer. (U.S. Patent 3,030,341 to Willard describes a suitable process for manufacturing diallyl phthalate prepolymers.) This prepolymer is then compounded with fillers, lubricants, a catalyst to insure cross-linking in the mold, and other desired addants to produce the final molding composition.

One difficulty that has occurred with molding compositions made from these diallyl phthalate resins is that, when subjected to elevated temperatures for extended periods of time, the molding compounds produce very small quantities of crystalline sublimates which can interfere with the operation of electrical equipment, particularly electronic micro switches. Despite the fact that this problem has confronted the industry for many years, no one to date has found how to overcome this difficulty.

The difficulty is intensified when the diallyl phthalate molding compositions are modified for flame retardancy. Flame retardance is generally imparted to such compositions by the use of a diallyl ester of a chlorinated polybasic acid, together with antimony oxide. The preferred chlorinated esters are the diallyl esters of chlorendic anhydride, a Diels-Alder condensate of hexachlorocyclopentadiene and maleic anhydride which is chemically 1,4,5,6,7-hexachlorobicyclo-(2.2.1)-5-heptene-2,3-dicarboxylic acid; and a similar ester of the Diels-Alder condensate of hexachlorocyclopentadiene and tetrahydrophthalic anhydride, which is chemically 1,2,3,4,9,9-hexachloro-1,4,4a,5,6,7,8a-octahydro-1,4-methanonaphthalene-6,7-dicarboxylic anhydride. For some reason the use of these addants tends to aggravate the sublimate problem with these compositions.

A primary market for diallyl phthalate molding compositions is represented by the various military markets, and in fact, the electrical and physical property requirements in the military specifications set the standards for the industry. Military specifications M–14F sets standards for weight loss at elevated temperatures, and a maximum dielectric constant for military use of 4.4 $10^3$ Hz. (cycles per second). Military specification MIL M–19833 includes a test for use in examining molding samples for ionic impurities. U.S. Pat. 3,362,928 discloses flame retardant diallyl phthalate molding compounds containing chlorinated organic compounds and antimony oxide, or other metal oxides, that can be molded into flame resistant articles which are inhibited against weight loss when subjected to high temperatures. However, these compositions do not meet either the "cold plate" sublimate test, or the ionic impurities test.

Molding compositions that do not produce crystalline sublimate in the "cold plate" oven test and which have low water extract conductivity test results and adequate electrical properties are desired.

SUMMARY OF THE INVENTION

We have now discovered filled diallyl orthophthalate prepolymer molding compositions which meet the military specifications and which do not produce crystalline sublimate at elevated temperatures in the "cold plate" test can be made by incorporating about 1 to 2.5% magnesium oxide in the molding compositions, based on the weight of the prepolymer. These small amounts of magnesium oxide do not adversely affect electrical properties and the amount of ionic impurities extracted by the water extract conductivity test is acceptable.

We have found flame retardant molding compositions can be made provided there is also present 2 to 10% by weight, based on the total resin, of a diallyl ester of a chlorendic acid insolubilized on antimony oxide. The flame retardant ester is added in the gel form in which the chlorine containing ester is converted to an essentially insoluble gel stage in the presence of antimony oxide, using from about 50 to 150 parts of antimony oxide to 100 parts of ester. A process for preparing these insoluble chlorine containing gelled esters is disclosed in copending patent application S.N. 534,669 of Beacham, Segro, and Thomas entitled: "Flame Retardant Compositions," filed June 2, 1966.

DESCRIPTION OF THE INVENTION AND THE PREFERRED EMBODIMENTS

The compositions of this invention contain at least 30% by weight of diallyl orthophthalate. The diallyl phthalate is preferably used in the prepolymer form, which can be prepared as described in U.S. Pat. 3,096,310. Diallyl orthophthalate prepolymer is generally prepared by polymerizing the monomer to a point just short of gellation and then separating the soluble prepolymer from the monomer by treatment with methanol to extract monomer from the prepolymer.

The molding compositions are made by blending the resin with filler, which may be reinforcing filler such as glass fibers, and non-reinforcing filler such as calcium silicate, silicia, talc, and the like. The materials also contain a catalyst to assure cross-linking of the product (generally a peroxide), very often a coupling agent which insures proper wetting of the fillers, and a mold release agent. The materials are compounded in any known manner. The sole difference between the compositions of this invention and those compositions commercially used is the small amount of magnesium oxide, which is preferably in the form of a finely divided powder to insure maximum availability and dispersability.

Care should be taken in using the magnesium oxide; above about 2.5% the electrical properties are adversely effected as are the flame resistant properties of flame resistant compositions. Optimum results are obtained in both sorts of compositions with about 1 to 2.5% of magnesium oxide by weight, based on the weight of the prepolymer. The molding compounds of this invention, like typical diallyl phthalate molding compounds, generally contain at least 30% diallyl phthalate prepolymer, and a small amount of diallylic phthalate monomer, of the order of 3–10%, based on the weight of the prepolymer. These compositions can contain up to about 200 parts by weight filler per 100 parts of polymerizable material, and commonly contain between 100 and 200 parts of filler per 100 parts of resin. These molding compounds generally contain up to about 5% by weight of a peroxide curing agent based on prepolymer.

The following typical examples of the invention are presented by way of illustration and not by way of limitation. In the examples all parts are by weight.

EXAMPLE 1

Ordinary molding composition

| | Parts |
|---|---|
| Diallyl Orthophthalate prepolymer | 40 |
| Glass fibers | 55 |
| Clay (ASP 400) | 5 |
| tert-butyl perbenzoate | 1 |
| tris(methoxyethyl)vinyl silane | 1 |
| Calcium stearate | 1 |
| Powdered magnesium oxide | (1) |

[1] As indicated in the following table.

The ingredients were mixed in a Patterson sigma blade mixer using sufficient acetone to flux the materials into a mass. After the acetone was evaporated, the dried material was discharged from the sigma blade mixer and then compounded on a heated two-roll rubber mill to produce a sheet which could be stripped cleanly from the mill. The stripped sheet was then ground in a Wiley mill to yield a dry granular molding powder.

Moldings made from this product were comparable in all electrical properties and mechanical properties with moldings made without the addition of the magnesium oxide. On testing for the development of sublimate at 155° C. for 300 hours, sublimate was encountered with the compositions without the magnesium oxide, and none with those containing magnesium oxide as shown in the following table.

The tests for sublimation were run as follows:

Test tubes are mounted in a conventional convection oven with the test tubes' lips extending into the atmosphere. One-quarter sections of ⅛″ x 2″ diameter molded discs are placed in the test tubes, and the test tubes are covered with a clean glass plate. Normally the piece of molded disc is weighed initially and after 96 hours. With the glass plate being in the outside atmosphere any sublimate is condensed on the plates and easily observed. Usually crystals will develop in the first few hours if the tendency is to do so. If no crystals appear in the first few hours, usually none appear after 96 hours or longer.

When the magnesium oxide was reduced to 0.9%, sublimate was obtained in very small quantities under these test conditions, however, this was eliminated when the magnesium oxide level was raised to 1%. A series of molding compounds were prepared according to the composition of this example except that the powdered magnesium oxide level was varied from 0.4 to 3.0% magnesium oxide. The electrical properties of the molded test samples were obtained. Also samples were finely ground and tested in the water extract conductivity test per MIL M–19833. The dielectric constant and the results of the water extract conductivity test are listed in the following table:

| MgO–PHR [1] by weight | Sublimation | DC (10³) cycles | Water extract conductivity test |
|---|---|---|---|
| 0 | Sublimes | 4.2 | 20 |
| 1.1 | No sublimation | 4.3 | 30 |
| 2.25 | No sublimation | 4.4 | 40 |
| 2.50 | No sublimation | 4.4 | 45 |
| COMPARISON SAMPLES | | | |
| 3.12 | No sublimation | 4.5 | [2] 110 |
| 5.0 | No sublimation | 4.7 | ([3]) |

[1] PHR = Parts per hundred of prepolymer.
[2] Maximum acceptable value in MIL M–19833 is 50.
[3] Test not run because the dielectric constant exceeded the maximum acceptable value of Military Specification M–14F of 4.4 at 10³ Hz.

This example shows that the dielectric constant for these compositions slowly increases from 4.2 to 4.4 at 1.0 to 2.5% MgO which is the maximum acceptable dielectric constant which meets the criteria of MIL Specification M–14F.

An extended series of flame-retardant compositions was then run, using the following formulations:

EXAMPLE 2

Diallyl phthalate resin with low magnesium oxide

| | G. |
|---|---|
| Diallyl orthophthalate prepolymer | 875 |
| t-butyl perbenzoate | 20 |
| tris(methoxyethyl)vinyl silane | 12 |
| Calcium stearate | 10 |
| Acetone | 1000 |
| Wollastonite-calcium silicate | 175 |
| ¼″ glass fibers | 900 |
| DAC gel—Diallyl chlorendate gelled on antimony oxide | 250 |
| MgO (1.14%) | 10 |

EXAMPLE 3

Diallyl orthophthalate resin with no mineral filler

| | G. |
|---|---|
| Diallyl orthophthalate prepolymer | 875 |
| t-butyl perbenzoate | 20 |
| tris(methoxyethyl)vinyl silane | 12 |
| Calcium stearate | 10 |
| Acetone | 1000 |
| ¼″ glass fibers | 900 |
| DAC gel of Example 2 | 425 |
| MgO (2.28%) | 20 |

EXAMPLE 4

A molding compound according to U.S. Patent 3,362,928 was prepared as follows using a diallyl phthalate prepolymer (prepared in accordance with U.S. Patent 3,096,310).

| Ingredient | Parts by weight | Comparison |
|---|---|---|
| Diallyl orthophthalate preploymer | 100 | 100 |
| Hydrated alumina | 8.5 | |
| Filler-glass fiber | 160 | 160 |
| Polymerization catalyst-t-butyl perbenzoate | 3.5 | 3.5 |
| Diallyl chlorendate (liquid monomer) | 10 | |
| Diallyl chlorendate gel (contains 50% by weight antimony oxide) | | 20 |
| Antimony oxide | 7 | |
| Stearic acid | 2 | 2 |
| Magnesium oxide | | 1.0 |

A quantity of the resulting molding compounds were placed in a mold heated to a temperature of 160° under a pressure of 4,000 p.s.i. for 5 minutes to produce an insoluble, infusible, 2″ diameter x ⅛″ thick disc. The discs were quartered and tested according to the sublimate test outlined in Example 1. Sublimate appeared on the cold glass plate within 4 hours in the comparison example and no sublimate was detected on the glass plate covering the example of this invention, even after 96 hours.

All the examples were made as in Example 1, the acetone in the examples being evaporated during the processing.

The diallyl chlorendate gel in the examples was made by mixing diallyl chlorendate monomer with an equal part by weight of antimony oxide pigment together with a small amount of tertiary butyl perbenzoate and a wetting agent. The material was mixed in a heavy duty mixer with a steam jacket. Mixing was continued for about 20 to 30 minutes, using 150 p.s.i.g. steam in the jacket. This resulted in conversion of the monomer to the insoluble state and the production of a crumbly mass of material. This was discharged from the mixer and ground to —200 mesh to produce the gel used in the examples.

Examples 2 to 4 were tested for crystal growth and weight loss at 155° C. using the method described in Example 1. None of the formulas showed any crystal formation, and weight losses were less than 1%. Moreover, when subjected to Military Specification M-14F using Federal Test Standard LP 406, Test Method No. 2023, all of these compositions passed this specification for flame resistance.

Mechanical and electrical testing of the examples indicated that the effect on these properties with this range of materials was not significant.

To indicate the effect of increased magnesium oxide content on flame retardancy, the composition of Example 2 was repeated using 2.28% magnesium oxide and 1.1% magnesium oxide. The composition of Example 2 gave a burning time of 45 seconds; the same composition using 2.28% magnesium oxide gave a burning time of 70 seconds, both well within the Military Specification Standard of 90 seconds. However, the composition containing 2.75% MgO had a flame time of 200+ seconds, which is unsatisfactory.

We have made compositions similar to the above with diallyl terephthalate and diallyl isophthalate prepolymers, and have made molding compositions in the gelled form described in U.S. Pat. 3,368,996.

Obviously these examples could be multiplied indefinitely in view of the possible permutations and combinations, without departing from the scope of the inventions defined in the claims.

What is claimed is:

1. A filled molding compound comprising at least 30% by weight of a heat advancing diallyl orthophthalate prepolymer, and a catalyst to promote the heat advancing thereof, and to avoid crystalline sublimate formation at high temperatures, 1 to 2.5% magnesium oxide based on the prepolymer.

2. The composition of claim 1 further comprising 2 to 10% by weight of a diallyl ester of a chlorinated polybasic acid selected from the group consisting of 1,4,5,6,7,7 - hexachlorobicyclo - (2.2.1)-5-heptene-2,3-dicarboxylic acid, and 1,2,3,4,9,9-hexachloro-1,4,4a,5,6,7,8,8a-octahydro-1,4-methanonaphthalene-6,7-dicarboxylic anhydride, insolubilized in the presence of sufficient antimony oxide to provide 1 to 10% by weight of antimony oxide in the molding compound.

References Cited
UNITED STATES PATENTS 3,362,928  1/1968  Dontje et al. _____ 260—41

MORRIS LIEBMAN, Primary Examiner

S. M. PERSON, Assistant Examiner

U.S. Cl. X.R.

260—45.75, 78.4, 78.5